July 7, 1964

C. DORN 3,140,118

SEAT FOR CAB OF AUTOMOTIVE TRUCK

Filed July 3, 1961

INVENTOR.
CHESTER DORN
BY
ATTORNEYS

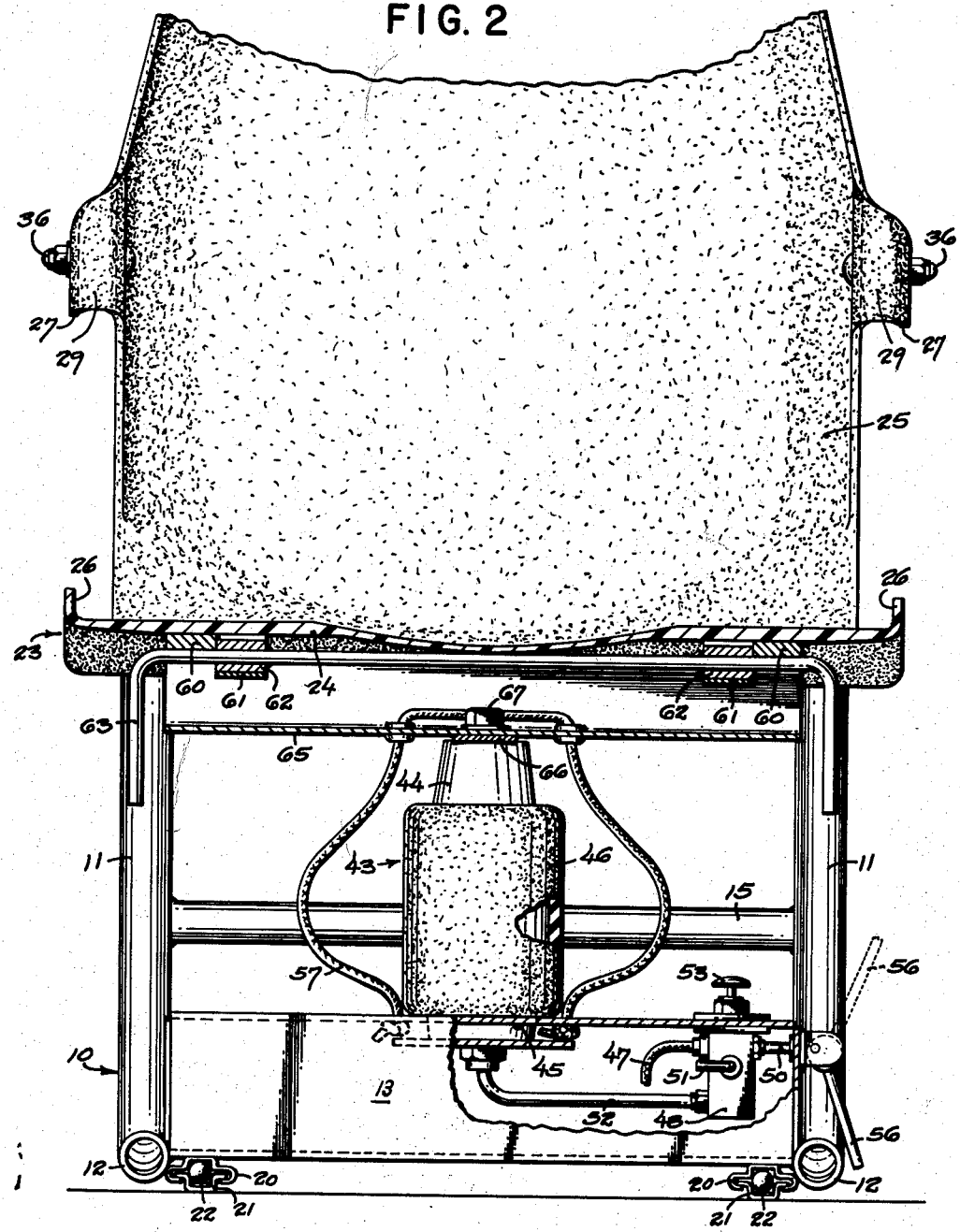

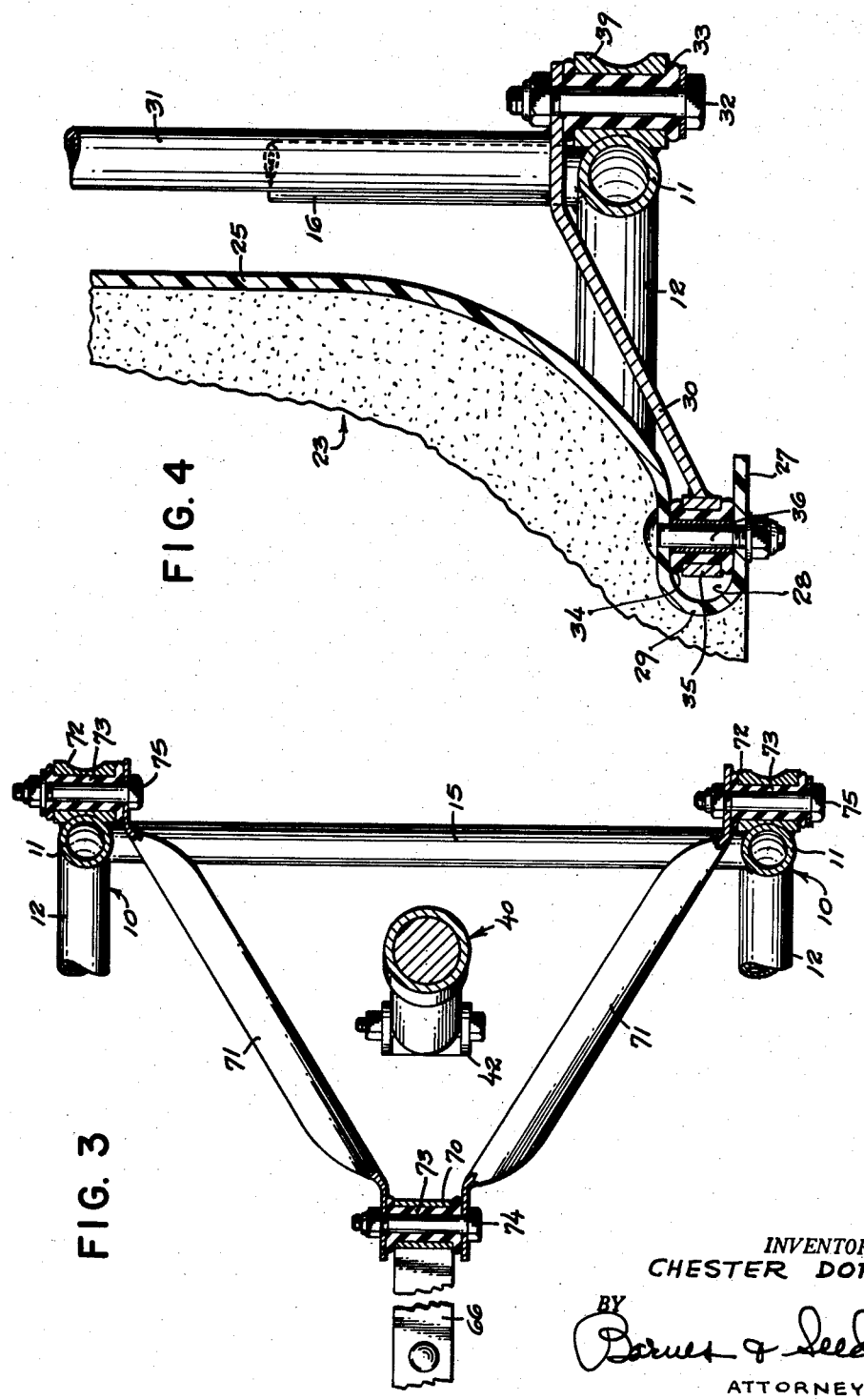

United States Patent Office 3,140,118
Patented July 7, 1964

3,140,118
SEAT FOR CAB OF AUTOMOTIVE TRUCK
Chester Dorn, Seattle, Wash., assignor to Pacific Car and Foundry Company, Seattle, Wash., a corporation of Washington
Filed July 3, 1961, Ser. No. 121,492
14 Claims. (Cl. 297—285)

This invention relates to a vehicle seat, and one which particularly lends itself to use in the cab of an automotive truck by a single occupant. The present application is a continuation-in-part of my pending application, Ser. No. 851,652, filed Nov. 9, 1959.

For its general object the invention aims to provide an improved vehicle seat of the general type illustrated and described in said application, later abandoned, and namely a seat employing a unitary foundation shell having an L-shape in side elevation and composed of a material the inherent resiliency of which yieldingly resists flexure of the two branches into an abnormal condition contracting the dihedral angle defined between said branches.

As a further more particular object the invention aims to provide a seat construction using in conjunction with said foundation shell an air spring so applied as to maintain the knee of an occupant practically level at all times while causing said occupant's rump and back to move vertically in an unusually soft dampened response to road irregularities over which the vehicle passes.

The above and other objects and advantages in view will appear and be understood in the course of the following description and claims, the invention consisting in the novel construction and in the adaptation and combination of parts hereinafter described and claimed.

In the accompanying drawings:

FIGURE 1 is a side elevational view portraying a vehicle seat constructed to embody the preferred teachings of the present invention, and for clarity in illustration deleting any showing of foam rubber pads and upholstery which fit over the seat and back portions of the indicated foundation shell. The view is fragmentary in its portrayal of the foundation shell, and in its showing of a flexible hose leading to the air spring from a source of pressure supply, and a fetter cord which prescribes a safety stop for the air spring's expansion movement.

FIG. 2 is a fragmentary transverse vertical sectional view on the jogged line 2—2 of FIG. 1.

FIG. 3 is a fragmentary horizontal sectional view on line 3—3 of FIG. 1; and

FIG. 4 is a fragmentary horizontal sectional view on line 4—4 of FIG. 1.

Figure 1:
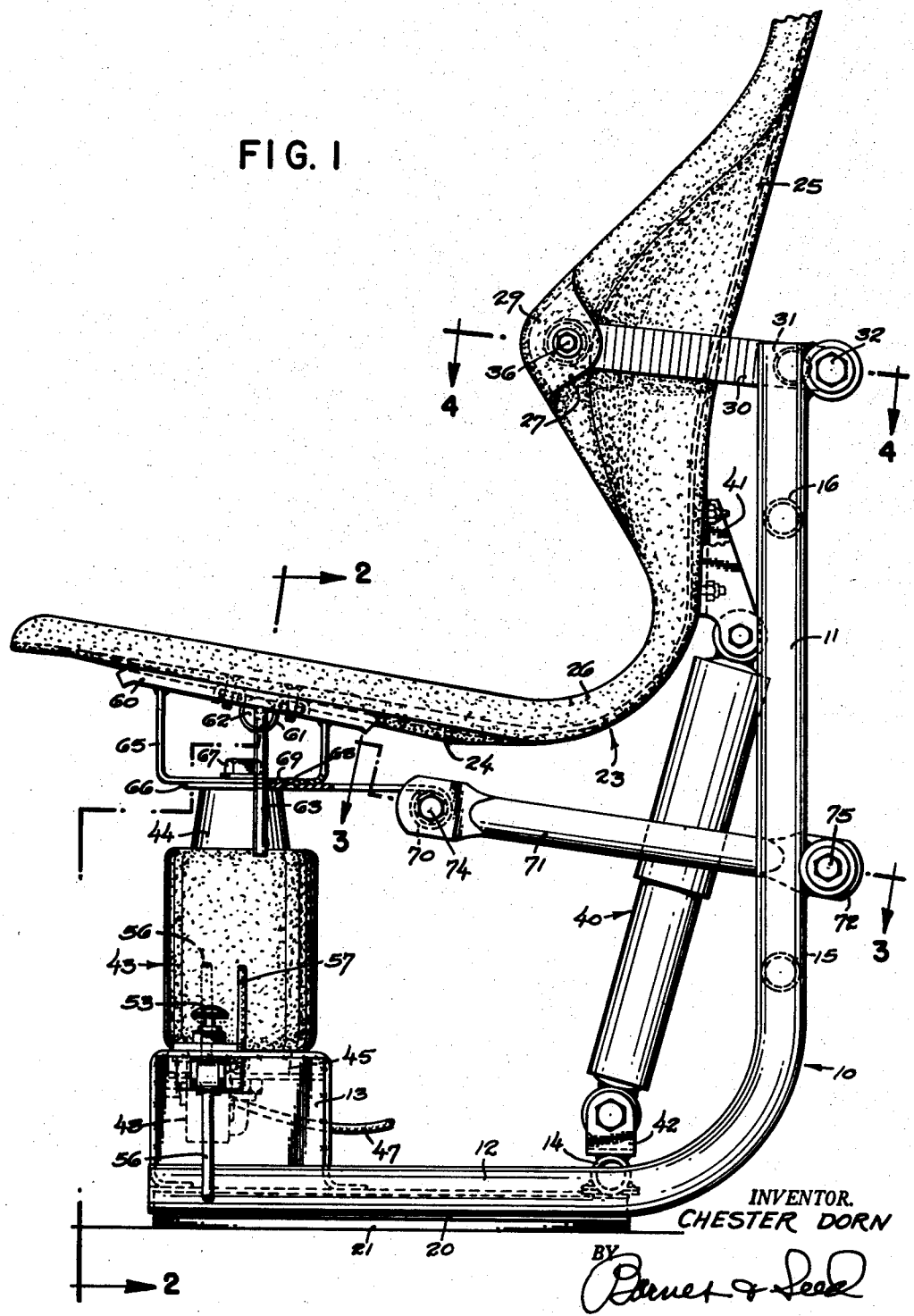

As a frame for the seat of the present invention, and with reference being had to the drawings, there are provided tubes 10 located parallel to one another in a vertical plane extending longitudinally of the driver's cab in which the seat is to be installed. These tubular frame pieces are L-shaped when viewed from the side to provide a vertical branch 11 which rises from the rear end of a horizontal bed section 12. The bed sections are connected across the front by an open-bottom box member 13, and across the rear by a tubular brace 14. Tubular cross braces 15 and 16 are also provided between the two riser branches 11. The frame has secured to its underside, adjacent each of the bed sections 12, a respective one of two movable rails 20. These rails are complemented by base rails 21 arranged to be secured upon the floor of said driver's cab and ride on captive balls 22. While not here illustrated it will be understood that suitable means are provided for releasably setting the movable rails at selected points within the limits of the permitted slide travel.

The seat proper of the present invention comprises a shell 23 molded to a general L-shape in side elevation from a resilient material such, by preference, as glass-fiber reinforced resin. The said shell is particularly characterized in that there is provided a yieldingly countered bodily flexing as between the seat branch 24 and the back branch 25. This flex action is a substantial hinge motion working about the apex of the L as a hinge fulcrum. The tensioning of the shell is obtained in part from the inherent resiliency of the "fiber glass" composition and in part from side lips 26 brought inwardly as marginal flanges. A shell of approximately ¼" thickness is highly satisfactory. By controlling the amount of reinforcing glass fibers used the resilience may be governed to produce substantially any desired resistance to bending.

The back branch 25 of the seat shell is molded so as to curve inwardly in a moderate degree through that portion of the shell which fits the "small" of a person's back occupying the seat, and which is to say more or less midway between the seat branch and the arm-pit of said occupying person. To insure that this curvature will remain constant against the flexure which the material of the seat shell's composition would otherwise permit, the lipping flanges in the area of the curvature are given a generally triangular shape as viewed from the side, with the apical prominence 29 which is thereby produced extending inwardly for a distance considerably greater than the flange width throughout the remaining length of the shell. At each apical prominence the material composing the shell is turned outwardly in a lateral direction and thence brought back, as at 27, to produce a parallel-sided furcate pocket 28 open to the rear. A respective one of two horizontal radius arms 30 are pivoted by one end in each of said pockets and have their opposite ends pivotally attached to the upper end of a respective one of the two frame risers 11. The radius arms are integrally joined by a tubular cross-member 31. At their rear or hinge end the pivot connection for said radius arms is provided by a pin 32 received with an intervening bushing 33 of elastic rubber through the center of an eye-bracket 39 which is welded to the riser 11.

The rubber bushing, conventionally comprised of two co-axial pieces, is compression-loaded so as to impose yielding restraint to the swing motion of the arm. A compressed rubber bushing 34 is also provided at the free front end of each arm between a terminal eye 35 and a mounting pin 36. The axial centers of the two pins 36 coincide, as do those of the brackets 39, with said two centers paralleling one another on horizontal axes extending transverse to the seat. As a complement to the yielding resistance imposed by said rubber bushings, vertical motions of the back portion of the shell are dampened by a vertical shock absorber 40 attached by its upper end to a shell-carried bracket 41 and by its lower end to a bracket 42 rigidly surmounting the frame cross-piece 14.

The seat portion of the shell is sustained by an air spring 43 which foots upon the box member 13 at a point central to the width. This air spring is or may be of ordinary construction, having the usual sealed air chamber described by upper and lower sections 44–45, respectively, connected by an elastic sealing muff 46 which is arranged to roll and unroll itself as air sealed within the chamber expands and contracts under force of changing compression loads. A flexible hose 47 leading from a tank of compressed air feeds to a valve body 48 the contained valve of which is governed by an axially movable control stem 50 so as to connect the chamber of the air spring either with said tank or with a dumping pipe 51, selectively. The valve body is preferably housed in the box member 13, connecting with the air chamber of the air spring by a pipe 52, and is equipped with an exposed manually controlled cut-off regulator 53 to govern the pressure of the air supplied to the spring. It will be understood that the occupant of the seat gives to the regulator knob 53 the setting which produces the most comfortable ride. Once the proper setting is arrived at the occupant of the seat finds no need to alter the same. It is desirable, however, for an occupant to dump air from the bag when leaving the cab and refill the same after again returning to the cab in that the lowered level of the seat thereby obtained greatly facilitates leaving and re-entering the cab. For greatest ease in performing this operation a manually controlled lever 56, functional to the stem 50, is exposed to the left side of the box member 13 in a position conveniently at hand for use by the truck driver, full and broken lines in FIG. 2 representing the position occupied by said lever when dumping and introducing air, respectively. A fetter cord 57 limits the expansion rise of the bag.

To attach the seat portion of the shell to said upper section 44 of the air spring there are provided two longitudinally extending shoes 60 which bear upon the underside of the shell, one adjacent one side edge and the other adjacent the other side edge of the shell. To the immediate inside of these shoes a respective U-shaped strap 61 is riveted to the underside of the shell, and a respective cylindrical cam 62 is journaled in the bight of each of these straps. The cams have holes drilled therethrough eccentric to the perimeter, and passing through these holes and welded to the cams so that the cams can be turned in concert is the cross-arm of a U-shaped cinching lever 63. This cross-arm shoulders upon the underside of the shoes so as, by thrust imposed from the eccentric cams, to frictionally lock the shoes at selected positions longitudinally adjusted in relation to the seat portion of the shell. The shoes rest upon and are welded to the side flanges of a transversely extending channel member 65. With an intervening bracket 66, the web of the channel is secured by a bolt 67 in surmounting relation to said upper section 44 of the air spring. The bracket, which is formed from a leaf and extends rearwardly from the air spring in a horizontal plane, is held against turning (see FIG. 1) by the mating interfit of a dimple 68 and aperture 69, and upon its rear end provides an eyed terminal 70. Horizontal radius arms 71 shackle this eye to frame-carried eye-brackets 72 in much the same manner as the shackling radius arms 30, and which is to say with rubber bushings 73 compression-loaded by clamp pressure exerted from the bolts 74 and 75. The two shackle arms 71 converge inwardly toward the eyed terminal 70, and are given a channel shape for structural rigidity.

The operation of the described seat is believed clear. Shifting of the shoes changes the angularity between the seat and back section of the seat shell in that the lower shackle arms substantially localize the shoes against fore and aft motion while the upper shackle arms hold the back section to motion in an established path. Jolts and jars are almost entirely cancelled out by the conjunctive spring action of the seat shell and air bag, dampened by the shock absorber.

It is believed that the invention will have been clearly understood from the foregoing detailed description of my illustrated now preferred embodiment. Minor changes in the details of construction will suggest themselves and I accordingly intend that no limitations be implied and that the hereto annexed claims be given a scope fully commensurate with the broadest interpretation which the employed language fairly admits.

What I claim is:

1. In a vehicle seat, a unitary shell of molded fiber-reinforced resin formed to a substantial L-shape in side elevation so as to provide two sections one of which serves as a seat and the other as a back and having an upturned stiffening lip extending as a flange along each side edge of the shell yieldingly resisting flexure of said sections into an abnormal condition contracting the dihedral angle defined between said sections, means guiding the back section for bodily travel in an established vertical path, a spring means on which the seat section bears yieldingly resisting depressive movement of the seat section, and means guiding the seat section to motion in an established vertical path.

2. In a vehicle seat, a unitary shell of molded fiber-reinforced resin formed to a substantial L-shape in side elevation so as to provide two sections one of which serves as a seat and the other as a back and characterized by an inherent resiliency which yieldingly counters flexure of said sections into an abnormal condition contracting the dihedral angle defined between said sections, means guiding the back section for bodiy travel in an established vertical path, a spring means on which the seat section bears yieldingly resisting depressive movement of the seat section, and means guiding the seat section to motion in an established vertical path.

3. In a vehicle seat, a unitary shell of resilient sheet material formed to a substantial L-shape in side elevation so as to provide two connecting sections one of which serves as a seat and the other as a back with the resiliency such as to impose a yielding resistance to flexure of said sections into an abnormal condition contracting the dihedral angle defined between said sections, means guiding the back section for bodily travel in an established vertical path, a spring means on which the seat section bears yieldingly resisting depressive movement of the seat section, and means guiding the seat section to motion in an established vertical path.

4. In a vehicle seat, a unitary shell of resilient sheet material formed to a substantial L-shape in side elevation so as to provide two connecting sections one of which serves as a seat and the other as a back with the resiliency such as to impose a yielding resistance to flexure of said sections into an abnormal condition contracting the dihedral angle defined between said sections, means guiding the back section for bodily travel in an established vertical path, a spring means on which the seat section bears yieldingly resisting depressive movement of the seat section, and shackle arms connected with the seat section holding said seat section to movement in an established vertical path.

5. In a vehicle seat, a unitary shell of resilient sheet sheet material formed to a substantial L-shape in side elevation so as to provide two connecting sections one of which serves as a seat and the other as a back with the resiliency such as to impose a yielding resistance to flexure of said sections into an abnormal condition contracting the dihedral angle defined between said sections, means guiding the back section for bodily travel in an established vertical path, an air spring on which the seat section bears yieldingly resisting depressive movement of the seat section, and shackle arms connected with the seat section holding said seat section to movement in an established vertical path.

6. The seat construction recited in claim 5, in which the seat is installed in the driver's cab of an automotive vehicle, and having means subject to manual control and located convenient to the driver either when occupying the seat or from a position alongside the cab for dumping pressure air from or introducing pressure air to the air spring so as by said dumping of pressure air, to lower the level of said seat section and by said introduction of pressure air, to raise the seat level.

7. In a vehicle seat, a unitary shell of resilient sheet material formed to a substantial L-shape in side elevation so as to provide two connecting sections one of which serves as a seat and the other as a back with the resiliency such as to impose a yielding resistance to flexure of said sections into an abnormal condition contracting the dihedral angle defined between said sections, a rigid framework providing a horizontal section spaced below said seat section of the shell and a riser section spaced to the rear of the back section of the shell, a respective upper horizontal radius arm for each of the two sides of the shell located on a level intermediate the height of the back section and extending as a shackle between said back section and the riser section, an air spring footing on the horizontal section of said framework and sustaining the seat section of the shell, and a respective lower horizontal radius arm for each of the two sides of the shell lying below the seat section and extending as a shackle between said seat section and the riser section.

8. The seat recited in claim 7 in which joints at both ends of each of the radius arms include bushings of elastic rubber compression-loaded between a pivot pin and a surrounding eye.

9. The seat recited in claim 7 having a shock-absorber located central to the width of the seat and extending vertically from the lower end of the back section to the horizontal section of the framework.

10. The seat recited in claim 7, in shackle provided by said two lower radius arms having substantially the shape of a wishbone when viewed from above.

11. In a vehicle seat, a unitary shell of resilient sheet material formed to a substantial L-shape in side elevation so as to provide two connecting sections one of which serves as a seat and the other as a back with the resiliency such as to impose a yielding resistance to flxeure of said sections into an abnormal condition contracting the dihedral angle defined between said sections, a rigid framework providing a horizontal section spaced below said seat section of the shell and a riser section spaced to the rear of the back section of the shell, a respective upper horizontal radius arm for each of the two sides of the shell located on a level intermediate the height of the back section and extending as a shackle between said back section and the riser section, a mounting means attached to the underside of the seat section of the shell, means for releasably setting said mounting means at selected positions adjusted longitudinally with respect to the seat section, an air spring footing upon the horizontal section of the framework and attached by its upper end to said mounting means, and a respective lower horizontal radius arm for each of the two sides of the seat extending as a shackle between said mounting means and the riser section of the framework.

12. The seat construction recited in claim 11, in which the seat is installed in the driver's cab of an automotive vehicle, and having means subject to manual control and located convenient to the driver either when occupying the seat or from a position alongside the cab for dumping pressure air from or introducing pressure air to the air spring so as by said dumping of pressure air, to lower the level of said seat section and by said introduction of pressure air, to raise the seat level.

13. In a vehicle seat, a unitary shell of molded fiber-reinforced resin formed to a substantial L-shape in side elevation so as to provide two sections one of which serves as a seat and the other as a back and characterized by an inherent resiliency which yieldingly counters flexure of said sections into an abnormal condition contracting the dihedral angle defined between said sections, means guiding the back section for bodily travel in an established vertical path, and spring means yieldingly resisting depressive movement of the seat section.

14. Structure according to claim 13 in which the seat section bears upon the spring means, engaging the latter at a point spaced toward the front end of the seat section beyond the weight center of a person occupying the seat.

References Cited in the file of this patent

UNITED STATES PATENTS

| | | |
|---|---|---|
| 1,565,054 | Brunker | Dec. 8, 1925 |
| 2,550,170 | Spiess | Apr. 24, 1951 |
| 2,598,421 | Page | May 27, 1952 |
| 2,606,592 | McIntyre | Aug. 12, 1952 |
| 2,808,875 | Bargen | Oct. 8, 1957 |
| 2,971,566 | Negroni | Feb. 14, 1961 |

FOREIGN PATENTS

| | | |
|---|---|---|
| 341,077 | Switzerland | Oct. 31, 1959 |